United States Patent [19]

Hodge et al.

[11] Patent Number: 5,388,109
[45] Date of Patent: Feb. 7, 1995

[54] DATA COMMUNICATIONS DEVICE WITH RESIDENT LINK ADAPTER

[75] Inventors: Dean Y. Hodge; Terry Herbster; Robert E. Ray, Jr., all of Madison; Fred C. Killmeyer, Huntsville, all of Ala.

[73] Assignee: Universal Data Systems, Inc., Huntsville, Ala.

[21] Appl. No.: 916,320

[22] Filed: Jul. 17, 1992

Related U.S. Application Data

[63] Continuation-in-part of Ser. No. 514,815, Apr. 26, 1990, abandoned.

[51] Int. Cl.$^6$ .................... G06F 11/10; H03M 13/00
[52] U.S. Cl. .................................. 371/53; 371/48
[58] Field of Search .............. 371/53, 5.1, 48, 51, 371/49.1, 37.1, 37.7, 37.5, 7, 15.1; 395/575, 425, 725; 370/13, 14, 15, 17

[56] References Cited

U.S. PATENT DOCUMENTS

| | | | |
|---|---|---|---|
| 4,377,862 | 3/1983 | Koford | 371/32 |
| 4,631,666 | 12/1986 | Harris | 364/200 |
| 4,845,715 | 7/1989 | Francisco | 371/53 |
| 4,914,654 | 4/1990 | Matsuda | 370/94.1 |
| 5,058,110 | 10/1991 | Beach | 370/85.6 |
| 5,063,523 | 11/1991 | Vrenjak | 364/514 |

FOREIGN PATENT DOCUMENTS

| 0156557 | 2/1985 | United Kingdom | 371/32 |
|---|---|---|---|

OTHER PUBLICATIONS

"An LSI Implementation of an Intelligent CRC Computer and Programmable Character Comparator," A. J. Weissberger, IEEE Trans. on Computers, Feb. 1980, pp. 116–124.

"Fast data–comm controller speaks to all protocols over two sets of channels," Magill et al., Electronic Design, Jan. 24, 1985, pp. 157–168.

"Control chip handles error checking and character-based protocols easily," A. J. Weissberger et al., Electronics, Mar. 27, 1980, pp. 151–154.

"Data Communications: A Comprehensive Approach," Held et al., McGraw-Hill, 1989, pp. 75–93, 274–275, 278–281 and 480.

Primary Examiner—Robert W. Beausoliel, Jr.
Assistant Examiner—Phung M. Chung
Attorney, Agent, or Firm—J. Ray Wood; Wayne J. Egan

[57] ABSTRACT

A data communications device (101, 119) may be controlled from a centrally-located network management system controller (109) located some distance from the device. The data communications device is coupled to the network management system controller by a local channel (155, 157). The device includes a link adapter (133, 143) that communicates with the controller by a protocol that allows the device to exchange messages with the controller. As many as 512 devices may be coupled to the same local channel.

14 Claims, 4 Drawing Sheets

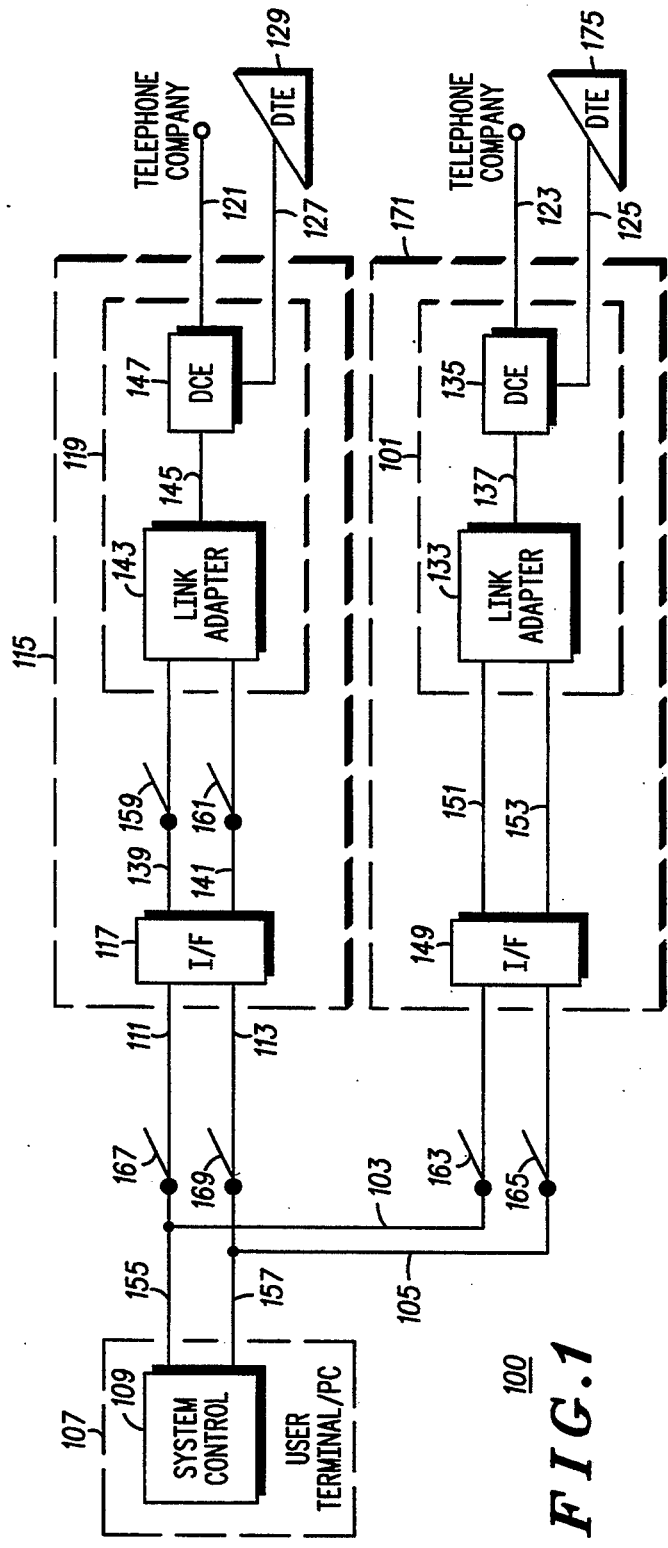
FIG.1
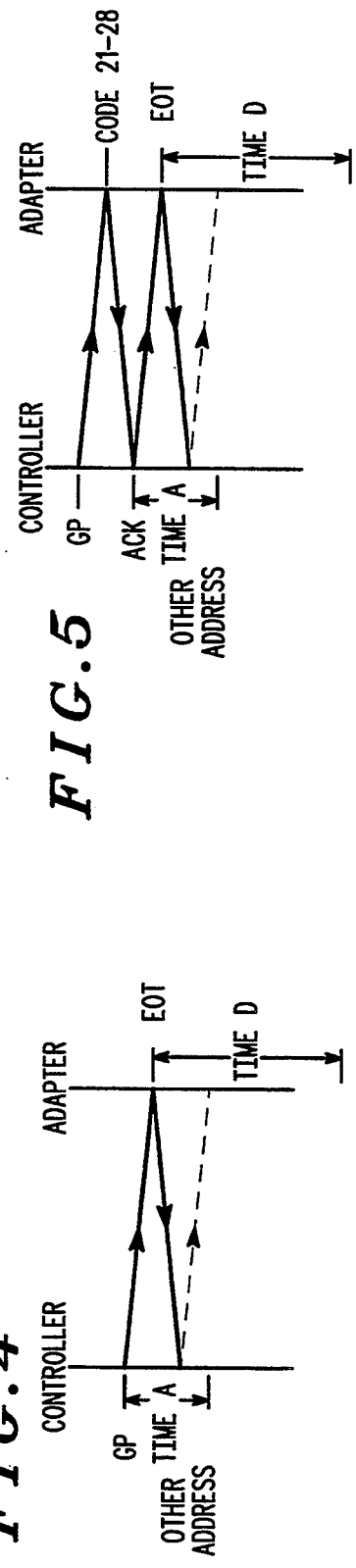
FIG.5
FIG.4

DATA COMMUNICATIONS DEVICE WITH RESIDENT LINK ADAPTER

CROSS-REFERENCE TO RELATED APPLICATION

This is a continuation-in-part of prior application Ser. No. 07/514,815, filed Apr. 26, 1990, now abandoned by Dean Yates Hodge et al., the same inventors as in the present application, which prior application is assigned to Universal Data Systems, Inc., the same assignee as in the present application, and which prior application is hereby incorporated by reference verbatim, with the same effect as though the prior application were fully and completely set forth herein.

FIELD OF THE INVENTION

This application relates to data communications devices including, but not limited to, modems that may be used with network management systems.

BACKGROUND OF THE INVENTION

Data communications devices such as modems, multiplexers, line drivers, digital service units, etc., are generally well known in the art. The following comments, while couched in terms of "data communications devices" or "devices," are equally applicable to specific data communications devices, such as modems, multiplexers, line drivers, digital service units, etc.

As is known, these data communications devices are used to transmit data signals via telephone lines to similar devices located remotely.

Recently these devices have been equipped with microprocessors that have enabled the devices to perform functions in addition to their normal data communication functions. For example, these microprocessors have run maintenance routines to test the operating conditions of the devices. Further, some maintenance routines have included fixing the device when it became disabled. Also, these microprocessors have enabled the device to change or vary its operating parameters at the whim of the user. In general, then, these new devices have included additional control and maintenance abilities.

The problem with these new capabilities, however, is that the features still required manual action by an operator in order to be utilized properly. Early data communications devices, therefore, while they had increased control and maintenance functions, it was still necessary for a user to be at the same location as the device in order to activate the new features. The problem with this was, of course, that large data communications networks might have many data communications devices located throughout geographically spread-out area. Thus, the over-all ability to control and maintain the network was still limited by the user's ability to travel to the device and perform the adjustments.

As a result, there is a need for a data communications device that may be controlled from a centrally-located network management system controller.

SUMMARY OF THE INVENTION

A data communications device having an address and arranged for use in a data communications system having a network management system controller is disclosed. In accordance with the present invention, the data communications device is arranged for receiving a message comprising a plurality of words from the network management system controller in accordance with a predetermined method, the predetermined method comprising the steps of:

(a) receiving a first word;

(b) determining whether the first word contains a predetermined value;

(c) if the first word contains the predetermined value, then receiving a second, third, fourth, fifth, sixth and seventh words;

(d) determining whether an error has been received based on the value of the sixth and seventh words and a predetermined algorithm;

(e) determining whether the value of the second word is $>0$;

(f) if the value of the second word is $>0$, then:
receiving a predetermined number of subsequent words based on the value of the second word; and,
determining whether an error has been received based on the value of the last two subsequent words and the predetermined algorithm;

(h) determining whether the third and fourth words contain the address;

(i) if the third and fourth words contain the address, then processing at least one received word;

wherein each received word is asynchronous.

Thus, in accordance with a data communications device with resident link adapter, in accordance with the present invention, a data communications device is disclosed that may be controlled from a distant central site. The data communications device includes means for coupling to a local channel which channel, in turn, is coupled to a system controller. The data communications device is equipped with a link adapter that may include, for example, a microprocessor that is arranged to communicate with the controller by a predetermined protocol. The protocol is arranged to allow the data communications device to exchange messages with the controller notwithstanding the fact that as many as 512 data communications devices may be coupled to the same local channel. By utilizing the protocol, a transparent communications link between the controller and the data communications device is achieved. As a result, the link adapter may communicate directly with the system controller without the use of any intermediate communication device.

BRIEF DESCRIPTION OF THE DRAWINGS

FIG. 1 is a block diagram that shows a first embodiment and a second embodiment of a data communications device with resident link adapter, in accordance with the present invention.

FIGS. 4-8 are sequence/response diagrams.

DETAILED DESCRIPTION

Figure 2:
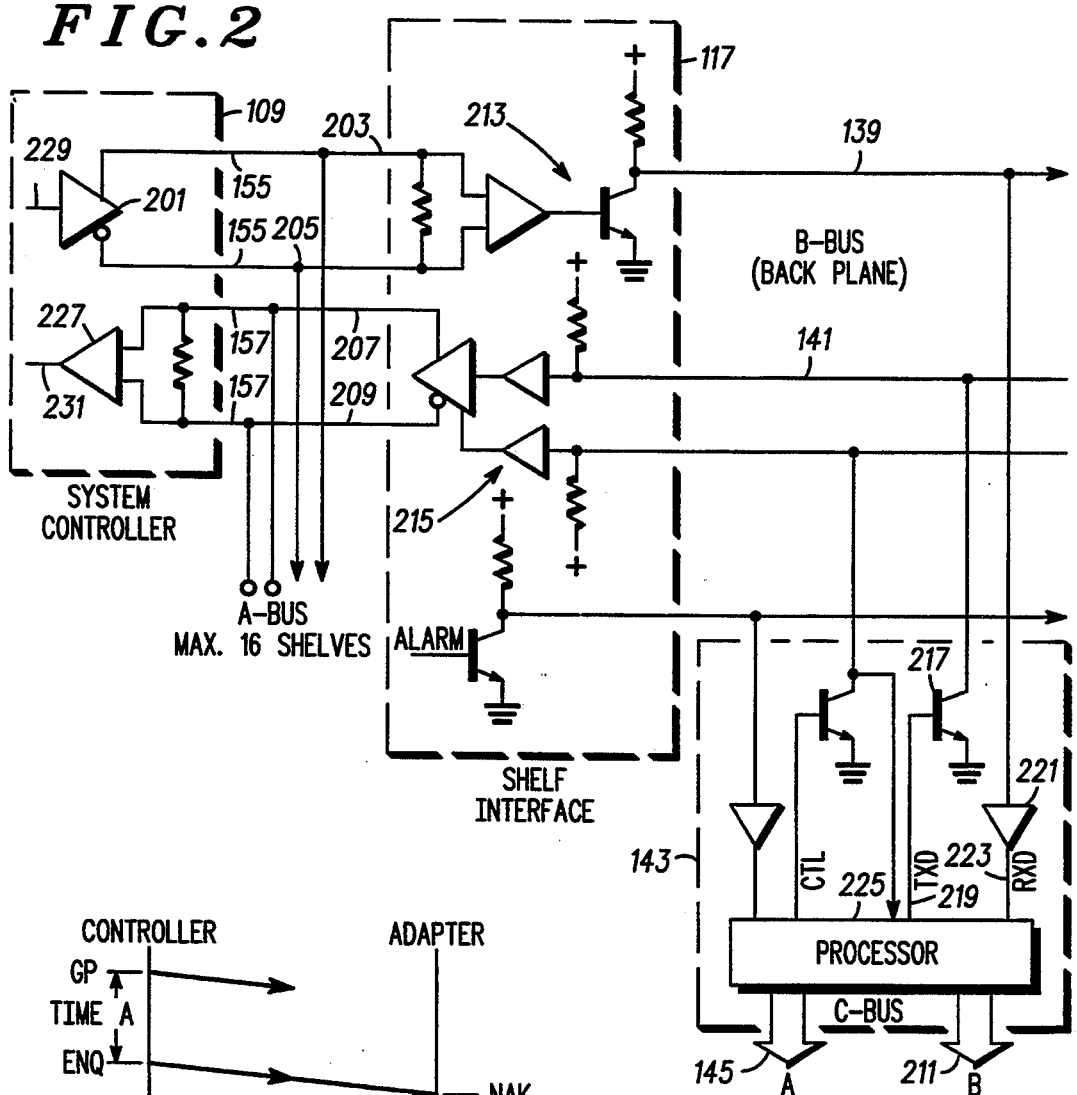
FIG. 2 shows further detail for FIG. 1.

Referring to FIG. 1, there is shown a communication system 100 equipped with a first data communications device 101 and a second data communication device 119, both devices 101 and 119 being arranged to communicate with a system controller 109 via a local channel 155, 157. The channel 155, 157 is a full-duplex channel, with channel 155 arranged to convey messages from the controller 109 to the data communications devices 1 01 and 119 (hereinafter the "downstream" direction) and channel 157 arranged to convey messages from the data communications devices 101 and 119 to the controller 109 (hereinafter the "upstream" direction).

In one embodiment, the system controller 109 may comprise a plug-in card with necessary processing capability, arranged to mount inside a terminal or microcomputer 107. In an alternate embodiment, the system controller 109 may comprise a software program resident in the terminal or microcomputer 107. Other embodiments are, of course, possible.

It will be appreciated that a system attendant will utilize the system controller 109 to control a plurality of distributed data communications devices 101 and 119.

Data communications device 101 is a stand-alone data communications device mounted in, for example, a desk-type housing 171. There may be more than one, or even a large number, of stand-alone data communications devices similar to data communications device 101 in the communication system 100. In such a case other data communications devices are connected to the system controller 109 in parallel with data communications device 101. This parallel connection is represented by the bridging points 163, 165.

As shown, data communications device 119 is a printed circuit board (hereinafter "PCB")-type data communications device mounted in a shelf 115. There may be a plurality of PCB-type data communications devices mounted in a single shelf 115. As a result, other data communications devices in the shelf 115 are connected in parallel with data communications device 119 via a parallel bus or back plane arrangement represented by bridging points 159, 161.

With reference now to data communications device 101, it will be appreciated the data communications device may be located a substantial distance from the system controller 109. As a result, the channel 155, 157 must be designed to support communications over such distances. One design choice would be a 4-wire RS-422-type channel. Other choices are also possible.

Referring still to data communications device 101, the data communications device is arranged to connect with an interface unit 149 via leads 1 51 and 153. This unit contains the necessary transmission electronics in order to support communications between the data communications device 101 and the system controller 109.

Referring now to data communications device 119, the data communications device is arranged to connect with an interface unit 117 via leads 139 and 141. The unit 117 is similar to unit 149, and performs similar functions. Since the shelf 115 may contain a plurality of data communications devices 119, a bus-type channel is provided to extend the leads 139 and 141 to other data communications devices 119 in the shelf. This is depicted as bridging points 159, 161.

Referring now to data communications device 101, it is seen the data communications device comprises a data communication equipment (hereinafter "DCE") unit 135, and a link adapter 133 coupled by link 137. The DCE 135, in turn, is coupled to a telephone channel 123 and a data terminal equipment (hereinafter "DTE") unit 175 by channel 125. The channel 125 may, for example, be compliant with the familiar RS-232-type specification.

Referring now to data communications device 119, it is seen the data communications device comprises a DCE unit 147, and a link adapter 143 coupled by link 145. The DCE 147, in turn, is coupled to a telephone channel 121 and a DTE unit 129 by channel 127.

It will be understood that the DCE 135 and 147 may be typical DCE as are known in the art. As known, these units function to allow the associated DTE to communicate with one or more remote DCE's via the associated telephone line. As known, such a DCE may be implemented, for example, by a suitably-programmed digital signal processor (hereinafter "DSP").

Referring now to data communications device 101, it will be appreciated that the system controller 109 is arranged to monitor and control data communications device 101 by sending and receiving messages via the circuit comprising channel elements 155, 157, 103, 105, the interface 149, links 151, 153, and the link adapter 133. The link adapter 133 is arranged to communicate with the system controller 109 via the foregoing circuit and, in turn, to monitor and control the associated DCE 135 via link 137.

Referring now to data communications device 119, it will be appreciated that the system controller 109 is arranged to monitor and control data communications device 119 by sending and receiving messages via the circuit comprising channel elements 155, 157, 111, 113, the interface 117, links 139, 141, and the link adapter 143. The link adapter 143 is arranged to communicate with the system controller 109 via the foregoing circuit, and to monitor and control the associated DCE 147 via link 145.

It will be understood that the link adapter 133 and 143 may be implemented, for example, by a suitably-programmed microcomputer. The MC68HC05-series of microprocessors from Motorola, Inc. for example, is one example of such a suitable microcomputer. This device may be programmed via user's manual AD1991R2, also available from Motorola, Inc.

FIG. 2 shows further detail for the shelf interface 117. (It will be understood that the single-data communications device interface 149 will be similar to that depicted here).

In what follows, it is assumed the system controller 109 wishes to send a message to the link adapter 143. The controller applies one or more words to the line driver 201 via lead 229. The words, for example, may be the familiar start/stop or asynchronous words, and each word may comprise a predetermined number of bits according to a predetermined code. For example, the well-known ASCII code may be used.

Line driver 201, in turn, applies the data signals to channel 155. As shown, channel 155 is a balanced 2-wire channel comprising conductor 203 and 205. The data signals are received by the shelf interface 117 via line receiver 213. Receiver 213, in turn, converts the balanced data signals to unbalanced signals and applies them to lead 139. The signals are then received by receiver 221 of the link adapter 143 and applied to the receive data (hereinafter "RXD") lead 223. Ultimately the RXD lead gates the data to a universal asynchronous receiver/transmitter (hereinafter "UART") which is part of the processor 225.

The processor 225, it will be understood, will decode all messages so received and will ultimately issue a local command to the associated DCE 147 via bus 145.

It will be recalled that data communications device 119 comprises link adapter 143 and DCE 147, all mounted on a PCB. With modern high-density integrated electronics, it is possible there may be two or more DCE's mounted on the same PCB. As a result, the link adapter 143 might be coupled to two or more DCE's similar to DCE 147. With respect to FIG. 2, it is assumed, therefore, that link adapter 143 is coupled to two DCE's, the first (DCE 147) via link A (element 145) and the second (not shown) via link B (211). The second DCE may be, for example, substantially identical to the first DCE 147.

In what follows, it is assumed the link adapter 143 wishes to send a message to the system controller 109. The processor 225 applies one or more words to the unbalanced line driver 217 via the transmit data (hereinafter "TXD") lead 219. As before, the message may comprise one or more asynchronous ASCII words. Line driver 217, in turn, applies the data signals to line driver 215 via lead 141. Line driver 215, in turn, converts the unbalanced data signals to balanced signals and applies them to channel 157. As shown, channel 157 comprises conductors 207 and 209. The signals are then received by the line receiver 227 which, in turn, applies them to the system controller 109.

The system controller 109, it will be understood, will interpret the received messages according to a predetermined relationship.

It will be appreciated that the link adapter such as, for example, 133 or 143, may be utilized to establish a communications link between the controller 109 and the system data communications devices such as, for example, 119 or 101. By utilizing the novel protocol described herein, transparency is achieved. As a result, the link adapter can communicate directly with the system controller without the use of any intermediate communication device.

As described herein, system messages comprise one or more frames, each comprising a plurality of asynchronous ASCII words.

In what follows, the abbreviation "BCC" indicates "block character check" and "CRC" indicates "cyclic redundancy check." The basic structure of a minimum length frame is as follows:

| Byte No: | Information: |
|---|---|
| 1. | STX |
| 2. | LENGTH (of extended frame) |
| 3. | ADDRESS (higher order) |
| 4. | ADDRESS (lower order) |
| 5. | COMMAND (defined herein) |
| 6. | ERROR CHECK (BCC or first CRC-16 byte) |
| 7. | ERROR CHECK (second CRC-16 byte). |

The error check method is optional. A single block check character may be used or a two byte, cyclic redundancy check may be substituted. In the preferred embodiment, the data format is asynchronous (start/stop) and uses an eight bit data field with no parity bit.

The minimum length frame contains six bytes (using BCC) or seven bytes if error detection is performed by CRC-16. In the preferred embodiment, the start of frame delimiter (Byte 1) is the ASCII character "STX." This character is not included in the error check.

Byte 2 is the length parameter. The length parameter is zero for a minimum length frame. It specifies the number of data bytes in the extended frame. It does not include error checking bytes.

Byte 3 is the same address. The definition of this byte is dependent upon the value that is assigned to the system bit (Byte 4, Bit 5). System 0 defines a 4-bit address for card position or slot and a 4-bit address for the enclosure or shelf. System 1 defines an 8-bit address of the range 0 to 255.

Byte 4 contains the secondary address and flags. The definition for five bits of this byte is dependent upon the value that is assigned to the system bit no. 5.

For system 0, bits 0 and 1 of byte 4 am used to address up to four devices that reside at the same card location or slot. Bits 2-4 are used as an auxiliary address. Link adapters may provide a means to monitor three auxiliary address signals. Adapters not having this provision will respond only to auxiliary address zero. Bit 5 is the system bit. It is decoded as an additional address bit and also operates as a format modifier on bytes 3 and 4 of the minimum length frame. Bit 6 is a global address indicator. The link adapter will not acknowledge commands that use a global address. Bit 7 is used to identify frames that are only segments of a complete message string.

For system 1, bits 0-4 of byte 4 describe a secondary address of the range 0-31. It provides a means to address up to 32 devices at each primary address. Bit 5 is the system bit. It is decoded as an additional address bit and also operates as a modifier on bytes 3 and 4 of the minimum length frame. Bit 6 is a global address indicator. The controller should receive no response to a command using a global address. Bit 7 is used to identify frames that are only segments of a complete message string.

Byte 5 contains the command/indicator codes. This byte defines the type of operation that is to be implemented by the link adapter. These codes are described below. Bits 6 and 7 of this byte are reserved for other purposes and must be excluded as a part of the command. Bits 6 and 7 should be set to zero until a definition is assigned.

Byte 6 contains an error check. The definition of this byte is option selectable. Error checking may be either a single byte, EXCLUSIVE-OR block check or a two byte CRC-16 product. Selection of CRC-16 will result in assignment of bytes 6 and 7 for error checking.

The exchange of data between the controller 109 and a data communications device may require an extended frame. Actual data begins with byte 7 or byte 8, depending upon the selected error checking option. The length of the data field is indicated by the length parameter (byte 2). The value of the length parameter does not include the error check byte or bytes (single byte for BCC or double byte for CRC).

The following are the command/indicator codes contained in byte 5. All codes are in HEX.

The following codes are controller originated, that is, they are transmitted in a downstream direction from the controller 109 to the data communications device:

| HEX: | MEANING: |
|---|---|
| 10 | General Poll |
| 11 | Modify Adapter Register |
| 12 | Data to Device |
| 13 | Reset Device |
| 14 | Reset link Adapter |
| 15 | Request Adapter I.D. |
| 16 | Request Test (Loop) |
| 17 | Power Alarm ACK |
| 18 | ENQ |
| 19 | (Unassigned) |
| 1A | Ignore Device |
| 1B | Listen Device |
| 1C | Configuration Field |
| 1D | Quiet |

| HEX: | MEANING: |
|---|---|
| 1E | ACK |
| 1F | NAK |

The following commands are adapter originated, that is, they are transmitted in an upstream direction from a data communications device to the controller 109:

| HEX: | MEANING: |
|---|---|
| 2A | Unsolicited Power Alarm |
| 2B | Unsolicited General Alarm |

The following are in response to a general poll:

| HEX: | MEANING: |
|---|---|
| 20 | EOT |
| 21 | Processing to Device |
| 22 | Data from device |
| 23 | Device Reset Complete |
| 24 | Adapter Initialized |
| 25 | Adapter I.D. |
| 26 | Looped Data Frame |
| 27 | Power Alarm |
| 28 | General Alarm |
| 29 | Reject Configuration |

The following are in response to Commands 11-16 and 1A-1C:

| HEX: | MEANING: |
|---|---|
| 22 | Data from Device |
| 2C | Receiver not ready |
| 2D | Receiver Buffer Overflow |
| 2E | ACK |
| 2F | NAK |

The following information applies to the controller to link adapter commands. When such a command is issued, the controller will expect a response from the link adapter within TIME A (see Table A, below). Failures will cause the controller to RETRY. The link adapter will have no limit assigned to the maximum number of RETRIES.

The GENERAL POLL is issued by the controller at intervals that are not to exceed TIME C (see Table A), for any device address. If the adapter has no specific information to report, it responds with the EOT frame.

The MODIFY ADAPTER REGISTER is used with an extended frame to modify a single register within the link adapter map. Refer to Table A for definitions of registers 1-10. The extended frame consists of two bytes. The first is the register number (1−n) and the second is the data, that is, the value of the modifier. Both data bytes are of binary form.

The DATA FIELD TO DEVICE command is used to inform the link adapter to store subsequent data for a direct transfer to the device or DCE. The data is in an extended frame and will contain the number of bytes that is given by the length parameter.

The RESET DEVICE command causes the link adapter to respond by applying a momentary reset to the addressed device. Then, the Device Reset Complete response is loaded into the transmit data queue.

The RESET LINK ADAPTER command is used with an extended frame of length 1 to expand the definition of reset. The byte is of binary form. Code 0 implements a hard reset that is the same as that which occurs with the application of power. The adapter applies a hardware reset to all devices and initializes all internal parameters. Code 1 causes the adapter to initialize all internal parameters and to issue a GO command to the specified device. The GO command is a device command which initializes data buffers to the link adapter's C-bus. Code 2 causes the adapter to initialize all internal parameters except those which affect the communications channel to the controller, that is, data rate and error check option. The adapter issues a GO command to the specified device.

The REQUEST ADAPTER I.D. command causes the link adapter to respond with an I. D. frame that includes ten data bytes. The data will consist of bytes 1-10 according to Table A, below.

The REQUEST TEST command causes the link adapter to collect an extended frame and return that same data with the looped data frame response.

The POWER ALARM ACK command is a specific acknowledgement for a power alarm. Power alarms will be detected by multiple link adapters. The specific ACK is intended to prevent multiple reports of one alarm condition. The acknowledgment should be addressed to the shelf, i.e., sixteen adapters. Link adapters will not respond to this command.

The ENQ is described as follows: The controller will wait TIME A (see Table A) for a response to a transmission, except for the QUIET command. A failure or time-out will cause the controller to issue the ENQ command. The link adapter will re-transmit the previous frame, if it is not at a status where a new frame is expected from the controller.

The IGNORE DEVICE command causes the link adapter to ignore data that is transmitted to it by the associated data communications device or device. The adapter should support the bit handshake with the device but should discard the data.

The LISTEN DEVICE command clears the IGNORE device status.

The CONFIGURATION FIELD command is described as follows: Nine bytes of data in the extended frame will directly modify nine bytes of link adapter interface data memory. The actual affected parameters are bytes 2-10, according to Table A. Any parameter that is incompatible with the adapter implementation will cause the adapter to issue the REJECT CONFIGURATION indicator in response to the next General Poll.

The QUIET command is issued by the controller to silence link adapters. The adapter will not acknowledge (ACK) the command. The adapter can respond only to a Request Adapter I. D. command. It will transmit no other data. The effect of this command is cleared by the General Poll.

The ACK (acknowledge) command is issued by the controller in response to all data frames that are properly received from the link adapter.

The NAK (negative acknowledge) command is issued by the controller as a request for re-transmission. It is issued by the controller following reception of an invalid frame.

The following information applies to the link adapter to controller commands. When such a command is issued, the link adapter will expect a response from the controller within TIME D (see Table A, below). A time-out will cause the adapter to revert to initial status, i.e., it will listen for a new frame.

The EOT (End of Transmission) command is issued in response to the General Poll if the link adapter has no other pertinent data for a specific device address. Also, the adapter will issue an EOT command in response to the ACK. The controller will wait TIME A (see Table A) for the EOT. A failure (time-out) will result in retransmission of the ACK, by the controller.

The PROCESSING TO DEVICE response is issued in response to the General Poll if the link adapter is transferring data to a device and has no other data in the transmit queue. The controller will time the interval between this indicator and the EOT indicator. Refer to Table A, Time B.

The DATA FIELD FROM DEVICE response is issued for all data strings that are generated by the device. The actual data is in the extended frame and the number of bytes will be given by the length parameter.

The DEVICE RESET COMPLETE response is issued as a result of a reset device command. It is issued by the link adapter after the device has been reset and is ready for operation.

The ADAPTER INITIALIZED response is issued as a result of the Reset link adapter command. It is part of the adapter initialization routine.

The ADAPTER I. D. response is issued in response to a General Poll and a request by the controller. The data is contained in a ten byte extended frame. See Table A.

The LOOPED DATA FRAME is a data test frame that is requested by the controller. The data contained in the extended frame is the same data that was contained in the controller request packet. It is issued in response to the General Poll.

The POWER ALARM is issued by the link adapter after having sensed an alarm condition from the power supply.

The GENERAL ALARM is issued in response to a General Poll, if an alarm condition exists. The alarm pertains to a fault condition that is detected by the adapter, not the device.

The REJECT CONFIGURATION is issued if the link adapter is not capable of implementing a requested configuration, in response to the General Poll.

The UNSOLICITED POWER ALARM is issued if a power alarm is pending for more than TIME E (see Table A). It is issued until the controller issues either an ACK or QUIET command.

The RECEIVE NOT READY is issued if the link adapter receive data buffer is unable to accept another packet, in response to any command, except for the General Poll. It is a spontaneous reply and will replace the ACK/NAK response.

The RECEIVE BUFFER OVERFLOW is issued, following reception of a data frame that exceeds the receive buffer capacity. It is a spontaneous reply and will replace ACK/NAK.

The ACK is issued to acknowledge reception of any packet other than the General Poll and Quiet Command. The ACK will be issued immediately, i.e., without a poll from the controller.

The NAK is issued in response to any packet containing errors. The NAK will occur spontaneously, i.e., without a poll from the controller.

Figure 3:
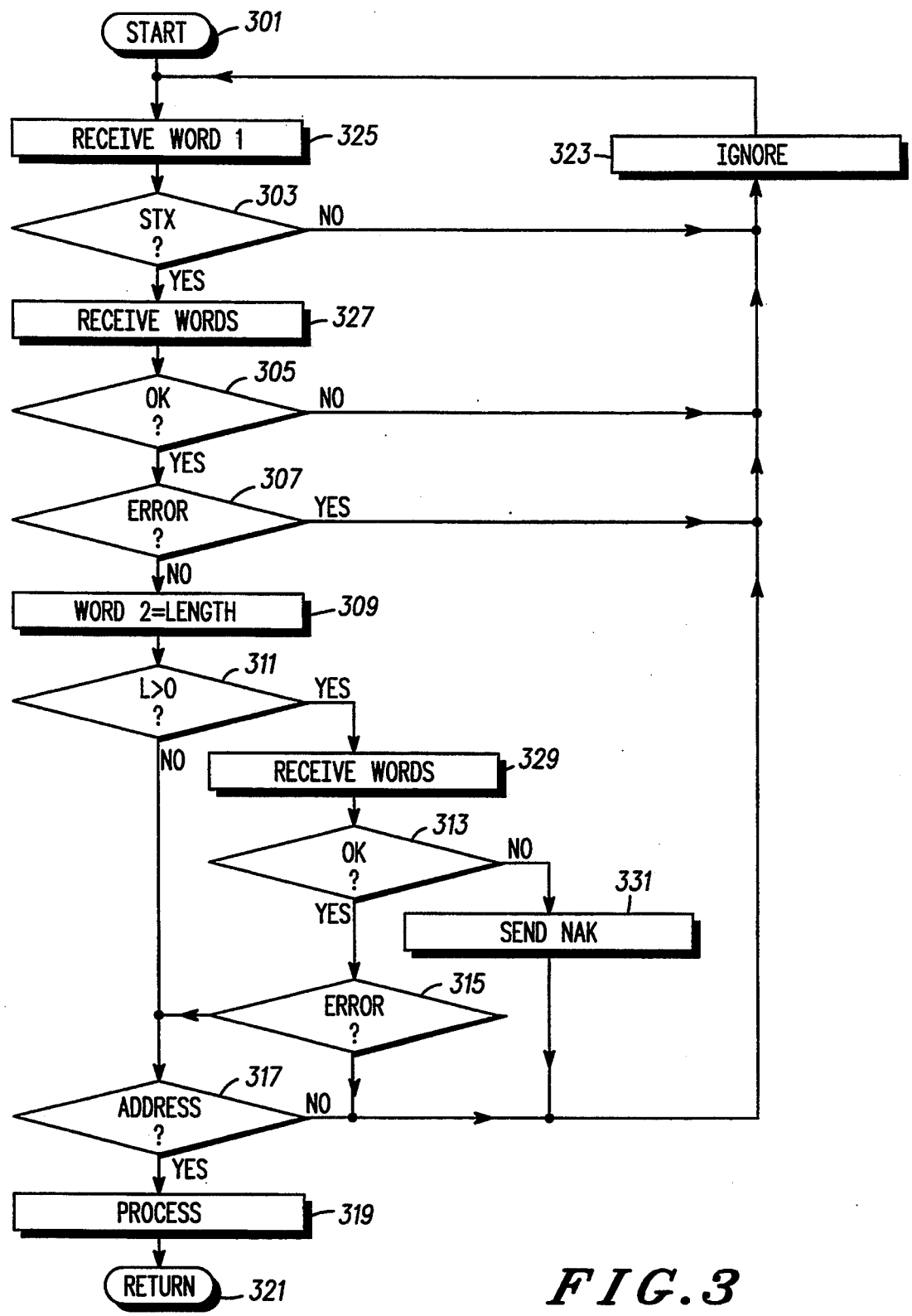
FIG. 3 is a flow diagram for a data communications device with resident link adapter, in accordance with the present invention.

Referring now to FIG. 3 there is depicted a flow diagram for a data communications device with resident link adapter to receive messages from the system controller, in accordance with the present invention.

The process starts at step 301 and then proceeds to step 325 where it receives a word. The process then goes to step 303 where it determines whether the received word contains a predetermined value. As mentioned above, the preferred embodiment uses the ASCII character "STX" but other choices are, of course, possible. If the received word is not STX, the process proceeds to step 323, where it ignores all received words. The process then returns to start (step 301).

If the received word is STX, the process proceeds to step 327, where it receives subsequent words. The process then proceeds to step 305, where it determines whether it has received a predetermined number of words, including STX as word 1. In the preferred embodiment, seven words are received, including STX as word 1. In an alternate embodiment, six words are received, including STX as word 1.

If step 305 determines that the required number of words have not been received, the process goes to step 323, where it ignores all received words. The process then returns to step 301.

Otherwise, if step 305 determines that the required number of words have been received, the process goes to step 307, where it determines whether the words received so far contain an error. In the preferred embodiment, seven words are received, including STX as word 1, with the last two words (word 6 and word 7) containing a 16-bit CRC error-check value. Alternately, six words are received, including STX as word 1, with the last word (word 6) containing an 8-bit BCC error-check value. In the preferred embodiment, the error check algorithm does not operate on the first word, since it contains a predetermined word (STX).

If an error is detected, the process goes to step 323, where it ignores all received words. The process then returns to step 301.

Otherwise, if no errors are detected, the process next goes to step 309, where it determines the length of the extended frame based on the value of word 2. In the preferred embodiment, the length of the extended frame is numerically equal to the value of word 2. The process next goes to step 311, where it determines whether the value of length >0.

Assuming now that length =0, then the determination from step 311 is negative. This indicates that the current frame does not include an extended frame. As a result, the process goes directly to step 317.

Assuming now that length >0, then the determination from step 311 is affirmative. This indicates that the current frame includes an extended frame comprising a number of subsequent words equal to the value of the parameter "length".

As a result, the process proceeds to step 329, where it receives subsequent words. The process then goes to step 313, where it determines whether it has received the required number of subsequent words. In the preferred embodiment, the required number is equal to the value of the parameter length, which is the value of word 2.

If step 313 determines that the required number of words have not been received, then the determination from step 313 is negative. As a result, the data communications device sends a NAK to the system controller, step 331. The process then goes to step 323, where it ignores all received words. The process then returns to step 301.

Otherwise, if step 313 determines that the required number of words have been received, the process goes to step 315, where it determines whether the words in the extended frame contain an error. In the preferred embodiment, the last two words in the extended frame contain a 16-bit CRC error-check value. Alternately, the last word contains an 8-bit BCC error-check value. In the preferred embodiment, the error-check algorithm operates only on the extended frame words.

If step 315 determines that an error exists, then the determination from step 315 is affirmative, and the process goes to step 323, where it ignores all received words. The process then returns to step 301.

Otherwise, if no errors are detected, the process goes to step 317.

At step 317 the process determines whether the received frame is intended for the data communications device that received it. It does this by comparing the frame address as contained in the received frame with the address of the receiving data communications device. In the preferred embodiment, words 3 and 4 of the frame contain the frame address. Other choices are, of course, possible.

If step 317 determines that the received frame address does not equal the address of the data communications device, then the process goes to step 323, where it ignores all received words. The process then returns to step 301.

Otherwise, if step 317 determines that the received frame address equals the address of the data communications device, then the process goes to step 319, where it processes one or more words contained in the frame. It will be understood that the term "processing" includes, for example, interpreting at least one received word and acting thereon in accord with a corresponding predetermined function. The process then returns (step 321) to step 301.

FIG. 4 is a sequence/response diagram for an ideal general poll, with no information from the adapter.

FIG. 5 is a sequence/response diagram for an ideal general poll, with data from the adapter.

For FIGS. 4-5, the controller is complete upon receiving an end of transmission ("EOT") from the adapter, and the adapter is complete upon receiving an OTHER ADDRESS from the controller, or else TIME D.

Figure 6:
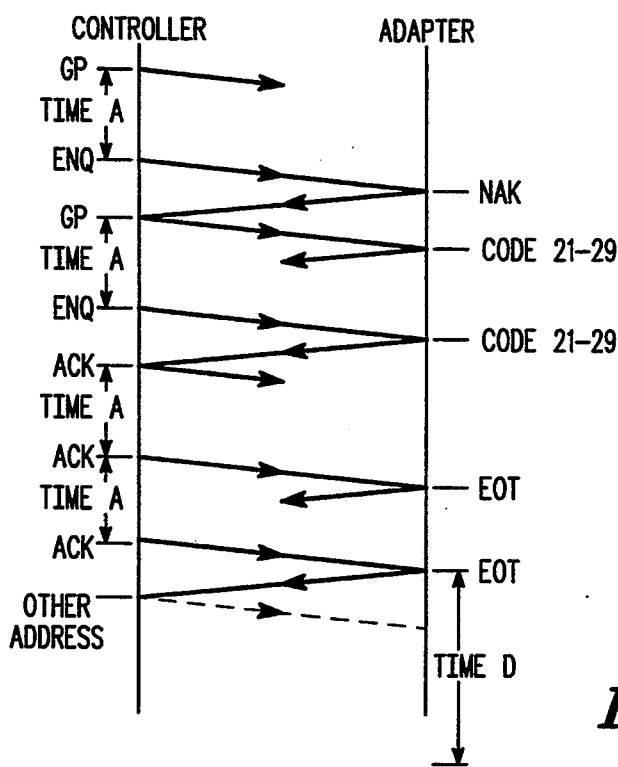

FIG. 6 is a sequence/response diagram for a general poll with various error conditions. Note that the first NAK sent by the adapter is because the adapter has not received a valid frame, as the ENQ previously sent by the controller is invalid. The controller is complete upon receiving an EOT from the adapter, and the adapter is complete upon receiving an OTHER ADDRESS from the controller, or else TIME D.

Figure 7:
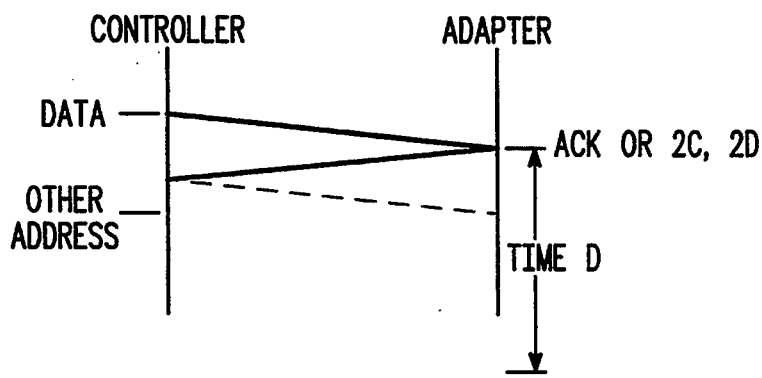

FIG. 7 is a sequence/response diagram for an ideal command exchange.

Figure 8:
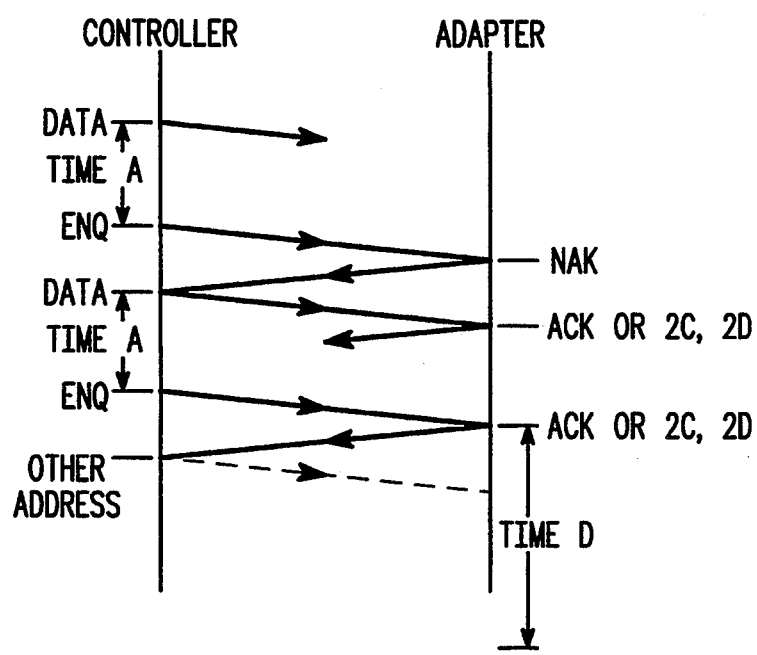

FIG. 8 is a sequence/response diagram for a command exchange with various error conditions. Note in FIG. 8 that the first NAK transmitted by the adapter is because the adapter has not received a valid frame, as the ENQ previously sent by the controller is invalid.

For FIGS. 7-8, the controller is complete upon receiving an ACK, 2C or 2D from the adapter, and the adapter is complete upon receiving an OTHER ADDRESS from the controller, or else TIME D.

The below Table A depicts register assignments for the link adapter.

The below Table B is a summary of commands.

TABLE A

LINK ADAPTER REGISTERS
IDENTIFICATION/CONFIGURATION

| REG.# | | | |
|---|---|---|---|
| 1. | REV. | PART# CODE | |
| 2. | Specification Level | | |
| 3. | RCV BUF B | Data Rate 2.4, 4.8, 9.6, 19.2 | (Notes 1, 2) |
| | RCV BUF A | | (Notes 1, 2) |
| 4. | XMT BUF B | ENAB. UNIT A | (Notes 1, 2) |
| | XMT BUF A | ENAB. UNIT B | (Notes 1, 2) |
| 5. | TIME A × 2 msec | (Controller time-out on adapter) | |
| 6. | TIME B × 0.5 sec | (Controller time-out for EOT response) | |
| 7. | TIME C × 0.5 sec | (Maximum poll interval; value 255 = ∞) | |
| 8. | TIME D × 10 msec | (Adapter time-out on Controller; 255 inhibits) | |
| 9. | TIME E × 0.5 sec | (Adapter time-out, unsolicited issue; value 255 inhibits issue) | |
| 10. | Error Test Option | (0 = BCC; 1 = CRC) | |

Note 1: Buffer:

| Code | Size |
|---|---|
| 0 | 0 |
| 1 | 12 |
| 2 | 18 |
| 3 | 24 |
| 4 | 30 |
| 5 | 36 |
| 6 | 42 |
| 7 | 48 |

Note 2: An adapter may implement a limited set of options in this field.

TABLE B

COMMAND SUMMARY

| Controller Command | Immediate Response | Eventual Response on General Poll |
|---|---|---|
| General Poll | EOT<br>Processing to Device<br>Data from Device<br>Device Reset Complete | N/A |

TABLE B-continued

| COMMAND SUMMARY | | |
|---|---|---|
| | Adapter Initialized | |
| | Adapter I.D. | |
| | Looped Data Frame | |
| | Power Alarm | |
| | (Note 3) | |
| | General Alarm | |
| | (Note 3) | |
| | Reject Configuration | |
| | NAK | |
| Modify Adapter Reg. | (Note 1) | (None) or |
| | | Reject Configuration |
| Data to Device | (Note 4) | (None) or |
| | | Data from Modem |
| Reset Modem | (Note 1) | Device Reset Complete |
| Reset Link Adapter | (Note 1) | Adapter Initialized |
| Request Adapter I.D. | (Note 1) | Device I.D. |
| Request Test Loop | (Note 1) | Looped Data Frame |
| Ignore Device | (Note 1) | (None) |
| Listen Device | (Note 1) | (None) |
| Configuration Field | (Note 1) | (None) or |
| | | Reject Configuration |
| Quiet | (None) | (None) |

Note 1: Receive Not Ready — Receive Buffer Overflow — ACK — NAK
Note 2: The controller response to link adapter indicators is ACK/NAK, except for power alarms. The polled and unsolicited power alarms will be acknowledged with Power Alarm ACK.
Note 3: These indicators may occur, unsolicited.
Note 4: Same as General Poll including ACK.

While various embodiments of a data communications device with resident link adapter, according to the present invention, have been described hereinabove, the scope of the invention is defined by the following claims.

What is claimed is:

1. In a data communications device having an address and arranged for use in a data communications system having a network management system controller, the data communications device arranged for receiving a message comprising a plurality of words from the network management system controller in accordance with a predetermined method, the predetermined method comprising the steps of:
   (a) receiving a first word;
   (b) determining whether the first word contains a predetermined value;
   (c) if the first word contains the predetermined value, then receiving a second, third, fourth, fifth, sixth and seventh words;
   (d) determining whether an error has been received based on the value of the sixth and seventh words and a predetermined algorithm;
   (e) determining whether the value of the second word is >0;
   (f) if the value of the second word is >0, then:
      receiving a predetermined number of subsequent words based on the value of the second word; and,
      determining whether an error has been received based on the value of the last two subsequent words and the predetermined algorithm;
   (h) determining whether the third and fourth words contain the address;
   (i) if the third and fourth words contain the address, then processing at least one received word;
   wherein each received word is asynchronous.

2. The method of claim 1 wherein each received word includes 10 bits, comprising a start bit, 8 data bits, and a stop bit.

3. The method of claim 2 wherein the first word is start of text or STX.

4. The method of claim 3 wherein the predetermined algorithm is a 16-bit cyclic redundancy check (CRC).

5. The method of claim 4 wherein the data communications device is a modem.

6. In a data communications device having an address and arranged for use in a data communications system having a network management system controller, the data communications device arranged for receiving a message comprising a plurality of words from the network management system controller in accordance with a predetermined method, the predetermined method comprising the steps of:
   (a) receiving a first word;
   (b) determining whether the first word contains a predetermined value;
   (c) if the first word contains the predetermined value, then receiving a second, third, fourth, fifth, and sixth words;
   (d) determining whether an error has been received based on the value of the sixth word and a predetermined algorithm;
   (e) determining whether the value of the second word is >0;
   (f) if the value of the second word is >0, then:
      receiving a predetermined number of subsequent words based on the value of the second word; and,
      determining whether an error has been received based on the value of the last subsequent word and the predetermined algorithm;
   (h) determining whether the third and fourth words contain the address;
   (i) if the third and fourth words contain the address, then processing at least one received word;
   wherein each received word is asynchronous.

7. The method of claim 6 wherein each received word includes 10 bits, comprising a start bit, 8 data bits, and a stop bit.

8. The method of claim 7 wherein the first word is start of text or STX.

9. The method of claim 8 wherein the predetermined algorithm is an 8-bit block character check (BCC).

10. The method of claim 9 wherein the data communications device is a modem.

11. A data communications device having an address and capable of communicating with a network management system controller, the data communications device comprising:
- data communication means for communicating with at least one remote data communications device via a telephone line, and
- means for interfacing with at least one data terminal equipment;
- means for coupling to a local channel;
- means for receiving messages from a network management system controller according to a predetermined receive method via the local channel;
- means for sending messages to the network management system controller according to a predetermined transmit method via the local channel,
- the receiving means and the sending means capable of communicating directly with the system controller; wherein the receiving means comprises:
- means for receiving a first word;
- means for determining whether the first word contains a predetermined value;
- means for receiving a second, third, fourth, fifth, and sixth words if the first word contains the predetermined value;
- means for determining whether the second, third, fourth and fifth words contain an error based on the value of the sixth word and a predetermined algorithm;
- means for determining whether the value of the second word is >0;
- means for receiving a predetermined number of subsequent words based on the value of the second word if the value of the second word is >0;
- means for determining whether the subsequent words contain an error based on the value of the last subsequent word received and the predetermined algorithm;
- means for determining whether the value of the third and fourth words contain the address;
- means for processing at least one received word if the value of the third and fourth words contain the address.

12. A data communications device having an address and capable of communicating with a network management system controller, the data communications device comprising:
- data communication means for communicating with at least one remote data communications device via a telephone line, and
- means for interfacing with at least one data terminal equipment;
- means for coupling to a local channel;
- means for receiving messages from a network management system controller according to a predetermined receive method via the local channel;
- means for sending messages to the network management system controller according to a predetermined transmit method via the local channel,
- the receiving means and the sending means capable of communicating directly with the system controller; wherein the receiving means comprises:
- means for receiving a first word;
- means for determining whether the first word contains a predetermined value;
- means for receiving a second, third, fourth, fifth, sixth and seventh words if the first word contains the predetermined value;
- means for determining whether the second, third, fourth and fifth words contain an error based on the value of the sixth and seventh words and a predetermined algorithm;
- means for determining whether the value of the second word is >0;
- means for receiving a predetermined number of subsequent words based on the value of the second word if the value of the second word is >0;
- means for determining whether the subsequent words contain an error based on the value of the last two subsequent words received and the predetermined algorithm;
- means for determining whether the value of the third and fourth words contain the address;
- means for processing at least one received word if the value of the third and fourth words contain the address.

13. A shelf capable of mounting at least one data communications device and having an interface unit, the interface unit capable of coupling to a network management system controller via a local channel and capable of coupling to the at least one data communications device, the data communications device having an address, the data communications device comprising:
- data communication means for communicating with at least one other data communications device via a telephone line, and
- means for interfacing with at least one data terminal equipment;
- means for coupling to the interface unit;
- means for receiving messages from a network management system controller according to a predetermined receive method via the local channel;
- means for sending messages to the network management system controller according to a predetermined transmit method via the local channel,
- the receiving means and the sending means capable of communicating directly with the network management system controller; wherein the data communications device receiving means comprises:
- means for receiving a first word;
- means for determining whether the first word contains a predetermined value;
- means for receiving a second, third, fourth, fifth, and sixth words if the first word contains the predetermined value;
- means for determining whether the second, third, fourth and fifth words contain an error based on the value of the sixth word and a predetermined algorithm;
- means for determining whether the value of the second word is >0;
- means for receiving a predetermined number of subsequent words based on the value of the second word if the value of the second word is >0;
- means for determining whether the subsequent words contain an error based on the value of the last subsequent word received and the predetermined algorithm;
- means for determining whether the value of the third and fourth words contain the address;
- means for processing at least one received word if the value of the third and fourth words contain the address.

14. A shelf capable of mounting at least one data communications device and having an interface unit, the interface unit capable of coupling to a network management system controller via a local channel and capable of coupling to the at least one data communications device, the data communications device having an address and, the data communications device comprising:

- data communication means for communicating with at least one other data communications device via a telephone line, and
- means for interfacing with at least one data terminal equipment;
- means for coupling to the interface unit;
- means for receiving messages from a network management system controller according to a predetermined receive method via the local channel;
- means for sending messages to the network management system controller according to a predetermined transmit method via the local channel,
- the receiving means and the sending means capable of communicating directly with the network management system controller; wherein the data communications device receiving means comprises:
  - means for receiving a first word;
  - means for determining whether the first word contains a predetermined value;
  - means for receiving a second, third, fourth, fifth, sixth and seventh words if the first word contains the predetermined value;
  - means for determining whether the second, third, fourth and fifth words contain an error based on the value of the sixth and seventh words and a predetermined algorithm;
  - means for determining whether the value of the second word is >0;
  - means for receiving a predetermined number of subsequent words based on the value of the second word if the value of the second word is >0;
  - means for determining whether the subsequent words contain an error based on the value of the last two subsequent words received and the predetermined algorithm;
  - means for determining whether the value of the third and fourth words contain the address;
  - means for processing at least one received word if the value of the third and fourth words contain the address.

* * * * *